United States Patent Office 3,542,925
Patented Nov. 24, 1970

3,542,925
6-AMINO-PENICILLANIC ACID DERIVATIVES FOR CONTROL OF GRAM POSITIVE BACTERIAL INFECTIONS
Peter Baumann, Fullinsdorf, Basel-Land, and Markus Zimmermann, Riehen, Switzerland, assignors to Geigy Chemical Corporation, Ardsley, N.Y., a corporation of New York
No Drawing. Continuation-in-part of application Ser. No. 522,394, Jan. 24, 1966. This application Nov. 3, 1967, Ser. No. 680,337
Claims priority, application Switzerland, Jan. 29, 1965, 1,282/65
Int. Cl. A61k 21/00
U.S. Cl. 424—263          15 Claims

ABSTRACT OF THE DISCLOSURE

A method of controlling bacteria capable of causing infectious diseases in mammals and especially penicillin G-resistant Staphylococcus aureus and the like penicillin-resistant strains with the aid of 6-[3-alkoxy- and 3-alkyl-thio-2-pyridyl]penicillins, and antibacterial agents containing the latter.

CROSS-REFERENCE TO RELATED APPLICATIONS

This application is a divisional and continuation-in-part of our pending application Ser. No. 522,394, filed Jan. 24, 1966 now U.S. Pat. No. 3,354,145.

DETAILED DISCLOSURE

This invention relates to novel antibacterial agents containing new 6-amino penicillanic acid derivatives which are chemotherapeutically useful, or salts of these derivatives, especially those which are pharmaceutically acceptable, and to the use of such agents for the treatment of bacterial infectious diseases, especially those caused in mammals, by penicillin-G-resistant bacteria.

Penicillins which have been known for a long time such as benzyl penicillin (=Penicillin G) or phenoxymethyl penicillin (=Penicillin V), have proved excellent for the treatment of infections caused by gram-positive bacteria. They have the disadvantage, however, of being ineffective against the so-called penicillin resistant strains of Staphylococcus aureus which produce the enzyme penicillinase.

Ever since 6-amino penicillanic acid became available as basic structure of all penicillins attempts have been made to find by semisynthetic means new penicillins which are active against resistant strains of Staphylococcus aureus.

It has now been found that, surprisingly, penicillins of the formula

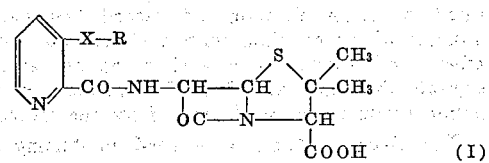

wherein:
X represents oxygen or sulfur and
R represents a straight-chain alkyl or alkenyl radical having at most 4 carbon atoms, and their salts with inorganic or organic bases have excellent antibacterial activity against gram positive bacteria. These penicillins are also active against strains of Staphylococcus aureus which produce penicillinase and against which benzyl penicillin is inactive.

The penicillins produced according to the invention are substantially stable to the influence of mineral acid and can thus be administered not only parenterally but as such or, in the form of the pharmaceutically acceptable salts, also orally.

Certain known methoxy phenyl-penicillins have this property, but they also suffer from the disadvantage that they are not stable in the presence of acid and their range of activity is narrow; they are thus limited both in their mode of administration and range of action, in contrast to the new pyridyl-penicillins according to the invention.

In contrast to the known 2-pyridyl-penicillin, the new 3-substituted-2-pyridyl-penicillins of Formula I are unexpectedly many times superior in antibacterial effectiveness against such penicillin G-resistant Staphylococcus aureus strains as Geigy 5001 and 5003.

Compounds of Formula I in which R represents straight-chain alkyl of from 2 to 4 carbon atoms or straight-chain alkenyl of from 3 to 4 carbon atoms and X is oxygen are particularly effective against the above-mentioned highly-resistant Staphylococcus aureus strains. They have 100 times greater bacteriostatic activity than 2-pyridyl-penicillin.

More particularly, the invention therefore provides new antibacterial agents which contain a new penicillin falling under Formula I or a pharmaceutically acceptable salt thereof as active ingredient in conventional form for oral, rectal, local or parenteral administration to mammals. Suitable pharmaceutically acceptable salts are those with inorganic or organic bases, which, in the usual dosages, have themselves no physiological action or have a desirable effect, in particular a local anaesthetic action on parenteral administration. For example, the salts with the bases mentioned hereinafter are used.

Furthermore the invention provides for a method of controlling bacteria capable of causing infectious diseases, and especially penicillin G-resistant strains of Staphylococcus aureus, by administering to a mammal suffering from such disease, an antibacterially effective amount of a compound of Formula I or of a pharmaceutically acceptable salt of such compound.

While well tolerated dosages required to achieve satisfactory effectiveness against the aforesaid bacterial strains in mammals will differ widely depending on the species, age and weight of the subject under treatment as well as on the particular condition to be treated and, of course, the mode of administration, such dosages, generally, should be at least about 300 mg. daily, preferably administered parenterally in 3 dosages of 100 mg. each per day.

Dosage units for peroral administration preferably contain between 10% and 90% of the acid of Formula I or of a nontoxic salt thereof as active ingredient. They are produced by combining the active ingredient with, e.g., solid, pulverulent carriers such as lactose, sucrose, sorbitol, mannitol; starches such as potato starch, maize starch or amylopectin also laminaria powder or citrus pulp powder; cellulose derivatives or gelatin, optionally with the addition of lubricants such as magnesium or calcium stearate or polyethylene glycols (Carbowax) of suitable molecular weights, to form tablets or dragée (sugar-coated tablet) cores. The latter are coated, e.g., with concentrated sugar solutions which can also contain, e.g., gum arabic, talcum and/or titanium dioxide, or with a lacquer dissolved in easily volatile organic solvents or mixtures of solvents. Dyestuffs can be added to these coatings, e.g., to distinguish between varying dosages of active substance.

Dosage units for rectal administration are, e.g., suppositories which consist of a combinatiton of an acid of the general Formula I or a suitable non-toxic salt thereof with a neutral fatty basis, or they are gelatin rectal capsules which contain a combination of the active substance or a suitable salt thereof with polyethylene glycols (Carbowax) of suitable molecular weight.

Dry ampoules for the preparation of, preferably, 5–15% aqueous solutions for parenteral, particularly intravenous, intramuscular or subcutaneous administration, contain a water soluble, non-toxic salt of the acid of Formula I, optionally together with suitable solid stabilising agents and buffer substances.

Other forms for the local treatment of infections are ointments and powders. These can be prepared on using the carriers, diluents and additives usual hitherto for this purpose.

The penicillins of general Formula I and their salts are produced in a known manner; in the working up and in the formation of their salts, allowance should be made for hybrid ion properties of the end products. 6-aminopenicillanic acid or a salt thereof is reacted with a compound introducing the radical of an acid of the general Formula II

wherein X and R have the meanings given above and, if desired, the resulting compound of general Formula I is converted into a salt with an inorganic or organic base.

Compounds suitable for the introduction of the radical of an acid of general Formula II are, in particular, halides, preferably chlorides and bromides, anhydrides and mixed anhydrides in the presence of acid binding agents, the free acids in the presence of water binding agents, as well as azides and activated esters such as p-nitrophenyl ester. In the process according to the invention, particularly sodium or potassium bicarbonate, carbonate or hydroxide in aqueous-organic medium also tertiary organic bases such as triethylamine or pyridine in organic medium, e.g., in dioxan, tetrahydrofuran, acetone or chloroform are used as acid binding agents; dicyclohexyl carbodiimide, for example, is used as a water binding agent. Mixed anhydrides of acids of general Formula II comprise, e.g. on the one hand those with low alkanoic acids, particularly acetic acid, and on the other anhydrides with carbonic acid half esters such as are obtained by reaction of acids of general Formula II with chloroformic acid benzyl ester, -p-nitrobenzyl ester, -isobutyl ester, -ethyl ester or -allyl ester.

The reaction products of general Formula I are isolated from aqueous-organic or organic reaction media, for example, by dilution with water, acidification in the cold to a suitable pH and extracting of the 6-acylamino-penicillanic acid in an organic solvent which is not miscible with water. The acid mentioned can be extracted in turn from the organic solvent phase, e.g., with an aqueous sodium or potassium bicarbonate solution and the thus obtained aqueous solution of the sodium or potassium salt of 6-acylamino-penicillanic acid can be evaporated at low temperatures in vacuo, or preferably lyophilised. To produce salts with organic bases, for example with those mentioned below, the latter can be reacted, e.g., with the free acids in organic solvents, or the alkali metal salts of the acids can be brought together in water with salts of the organic bases, e.g., the hydrochlorides and the salts which precipitate can be removed and dried. Metal salts can also be precipitated from the solutions of the free acids of the penicillins in organic solvents by adding a metal salt which is soluble in butanol such as the potassium salt of α-ethyl caproic acid and, optionally, diluting with ether.

Examples of pharmaceutical acceptable salts of the new penicillins produced according to the invention are the sodium, potassium, ammonium, magnesium or calcium salt, or salts of organic bases such as diethylamine, triethylamine, diethanolamine, N-ethyl diethanolamine, pyrrolidine, piperidine, N-ethyl piperidine, 1 - (β - hydroxyethyl)-piperidine, morpholine, procaine, benzylamine, dibenzylamine, 1-phenyl-2-propylamine and other amines which are frequently used for the production of penicillin salts.

The 3-alkoxy- and 3-alkenyloxy-picolinic acids serving as starting materials are obtained, e.g., by reacting the known 3-hydroxy-picoline amide with reactive esters of low alkanols or alkenols, e.g., low alkyl halides or alkenyl halides, in the presence of an acid binding agent, e.g., potassium carbonate or sodium hydride, and hydrolysing the resulting 3-alkoxy- or 3-alkenyloxy-picoline amides. 3-alkylthio- and 3-alkenylthio-picolinic acids can be produced, e.g., by reducing the known 3,3'-dithio-bis-picolinic acid and then alkylating in situ, e.g., by the gradual addition of alkanolic sodium hydroxide solution to the alkanolic solution of dithio compound and glucose at ambient temperature or moderately elevated temperature, then adding dropwise a low alkyl halide, e.g., methyl or ethyl iodide, n-propyl bromide or n-butyl bromide, and, if necessary, heating and hydrolysing the ester which may be formed. The 3-alkenylthio-picolinic acids are produced analogously.

The following examples illustrate the process according to the invention but are by no means the sole methods of performing same. The temperatures are given in degrees centigrade. Percentages are given by weight.

Example 1

(a) 69 g. (0.5 mol) of 3-hydroxy-picoline amide (J. Chem. Soc. 1958, 4466–4470), 69 g. (0.5 mol) of potassium carbonate and 75 g. (0.55 mol) of n-butyl bromide are stirred at 80° in 800 ml. of dimethyl formamide until a control sample diluted with water has a pH of about 8, this is the case after 3 to 6 hours. The solid white components of the suspension are then easily water soluble (potassium bromide). The reaction mixture is stirred for another 5 minutes with a small amount of active charcoal and then filtered. The filtrate is evaporated to dryness in vacuo and the green residue is recrystallised from 300 ml. of isopropanol. 3-n-butoxy-picoline amide is thus obtained as almost colourless crystals which melt at 102–103°. A further amount of reaction product can be obtained from the mother liquor. It has the same melting point.

(b) 30 g. of 3-n-butoxy-picoline amide in 300 ml. of 5 N hydrochloric acid are refluxed for 14 hours and then the reaction mixture is evaporated to dryness in vacuo. The residue is extracted twice by boiling with 200 ml. of isopropanol each time. The combined isopropanol solutions are evaporated to dryness and the white residue is dissolved in the minimum necessary amount of water. The pH of the solution is adjusted with ammonia to 4 and the yellow solution is left to stand at 0° whereupon the reaction product gradually crystallises out. It is separated by suction filtration and washed, first with a small amount of water, then with acetone and finally with ether. 3-n-butoxy-picolinic acid is obtained as colourless crystals which melt at 128–130°. A further amount of reaction product can be obtained from the mother liquor.

The alkoxy-picolinic acids used as starting materials in the following examples can also be produced in an analogous manner, using equivalent amounts of the corresponding alkyl halides in lieu of n-butyl bromide.

(c) 1.17 g. of 3-n-butoxy-picolinic acid (M.P. 128–130°, decomposition) are dissolved in 30 ml. of benzene and the solution, with 0.6 ml. of thionyl chloride and 0.2 ml. of dimethyl formamide, is refluxed for 60 minutes. It is then evaporated under vacuo, the brown residue is dissolved in a small amount of benzene and again evaporated. The crude acid chloride which remains is dried for 1 hour in vacuo and is then used for the following reaction.

(d) 1.9 g. of triethyl ammonium salt of 6-amino-penicillanic acid are dissolved in 30 ml. of anhydrous chloroform and 1.5 ml. of triethylamine. The solution is cooled to 0°. The crude acid chloride dissolved in 10 ml. of chloroform is then added dropwise within 5 minutes and the reaction mixture is stirred for 1 hour at ambient temperature. The clear brown solution is evaporated in a rotary evaporator (water bath temperature 35°) and the residue is taken up in 30 ml. of water and 50 ml. of methyl isobutyl ketone. The pH of the aqueous part is adjusted to 2.1 with 10 N sulphuric acid while stirring, and the phases are separated. The aqueous phase is extracted with 5 ml. of methyl isobutyl ketone. The methyl isobutyl ketone extracts are combined, washed with 5 ml. of water and dried with sodium sulphate. The methyl isobutyl ketone solution is then extracted with so much aqueous 3% sodium bicarbonate solution that the aqueous part has a pH of 6.8. The phases are separated and the organic phase is again extracted with 5 ml. of water. The combined aqueous extracts are washed with 25 ml. of ether and dissolved ether is removed in a rotary evaporator. The clear solution of the sodium salt of 3-n-butoxy-2-pyridyl-penicillin obtained in this way is evaporated at a low temperature under high vacuum or lyophilised. The product, a pale grey powder, shows a strong band in the IR spectrum (potassium bromide) at $5.65\mu$, which is typical of the $\beta$-lactam ring.

In the incorporation test (test substances combined with an agar culture medium and combination inoculated with the pathogenic bacteria), the minimal concentrations of 3-n-butoxy-2-pyridyl penicillin which inhibit the growth of various Staphylococcus strains are:

| Staphylococcus strain: | Concentration in $\mu$g./ml. |
| --- | --- |
| Aureus Geigy 5001, r | 10 |
| Aureus Geigy 5003, r | 10 |
| Lactis NCTC 8340, s | 1 |
| Aureus Smith, s | 1 |

(r=resistant, s=sensitive to Penicillin G)

Albino mice are infected intraperitoneally each with about 28 million living *Staphylococcus aureus* bacteria (Smith ATCC 13709). 18 mg./kg. of the sodium salt of 3-n-butoxy-2-pyridyl penicillin administered intramuscularly cured half the animals ($=CD_{50}$).

Example 2

3-n-propoxy-2-pyridyl-penicillin is produced from 1.09 g. of 3-n-propoxy-picolinic acid (M.P. 117–118°, decomposition, obtained from 3-n-propoxy-picoline amide, M.P. 125–126°) the reaction conditions being otherwise essentially the same as given in Example 1.

The compound showed in all tests similar properties as the penicillin described in Example 1.

Example 3

2 g. of 3-ethoxy-picolinic acid (M.P. 151–153°, decomposition, obtained from 3-ethoxy-picoline amide, M.P. 213–214°) are dissolved in 20 ml. of acetone and 24 ml. of dioxan and then 2.0 ml. of triethylamine and 1.58 ml. of chloroformic acid isobutyl ester are added at 0–5°, cooling being effected in an ice bath. After stirring for 15 minutes at 0°, the reaction mixture is filtered and the filtrate is combined with a solution of 3.0 g. of 6-amino-penicillanic acid (86%) in 20 ml. of water and 2 ml. of triethylamine. After stirring for 15 minutes at 0°, the ice bath is removed and the reaction mixture is stirred for another 45 minutes at ambient temperature. 20 ml. of water containing 2 g. of sodium bicarbonate are then added and the whole is washed twice with 50 ml. of ether each time. The aqueous phase is covered with 50 ml. of methyl isobutyl ketone and the pH is adjusted to 2.2 with 10 N sulphuric acid. On stirring, the major part of the reaction product, in the form of the free acid, passes into the organic phase. The phases are separated and the aqueous part is extracted twice with 10 ml. of methyl isobutyl ketone each time. The combined organic extracts are washed free of acid with 2×5 ml. of water and dried with sodium sulphate. The solution is then reduced to half its volume under water jet vacuum, a slight excess of the stoichiometrical amount of the potassium salt of $\alpha$-ethyl caproic acid is added and, if no precipitate is formed, it is diluted with anhydrous ether. The potassium salt of 3-ethoxy-2-pyridyl-penicillin gradually flakes out. The mother liquor is removed in a centrifuge and the product is dried over phosphorous pentoxide in vacuo.

In the IR spectrum (potassium bromide), the pale grey powder shows the characteristic $\beta$-lactam band at $5.65\mu$.

If the necessary stoichiometrical amount of N-ethyl piperidine is added to the methyl isobutyl ketone solution of the free penicillin mentioned above, then the salt of the penicillin obtained with N-ethyl piperidine precipitates as a viscous oil. It is removed by decantation and dried in vacuo. It is also slightly soluble in water. A salt which is insoluble in water is obtained in the same way on using N,N'-dibenzyl ethylenediamine as base.

The sodium salt of 3-ethoxy-2-pyridyl-penicillin can be obtained from the methyl isobutyl ketone solution with 3% aqueous sodium bicarbonate solution in the manner mentioned in Example 1.

In the IR spectrum (potassium bromide), all these salts show the characteristic $\beta$-lactam ring bands at $5.65\mu$. In all cases, the purity of the salts, without further purification, approaches 100%. The sodium salt contains 1 mol. of water bound per mol. of penicillin.

Calcd. for $C_{16}H_{18}N_3NaO_5S \cdot H_2O$ (percent): N, 10.37; S, 7.91. Found (percent): N, 10.19; S, 7.92.

Acid stability: at pH 2 and 24°, the half life period, i.e., the time in which half the penicillin is decomposed, is 8 hours.

In the incorporation test, as applied in Example 1, the minimal concentrations inhibiting the growth of Staphylococcus strains are:

| Staphylococcus strain: | Concentration in $\mu$g./ml. |
| --- | --- |
| Aureus Geigy 5001, r | 33 |
| Aureus Geigy 5003, r | 10 |
| Lactis NCTC 8340, s | 1 |
| Aureus Smith, s | 1 |

In albino mice infected with *Staphylococcus aureus* Smith, the $CD_{50}$ was 1.8 mg./kg. on subcutaneous administration, 2.4 mg./kg. on intramuscular administration and between 3 and 7.5 mg./kg. on oral administration of the penicillin of this example.

Example 4

2.36 g. of 6-amino-penicillanic acid are suspended in 100 ml. of tetrahydrofuran/water 1:1 and sufficient sodium bicarbonate is added to give a clear solution. A solution of 1.53 g. of 3-methoxy-picolinic acid (M.P. 159–160°, decomposition, obtained from 3-methoxy-picoline amide, M.P. 196–197°, sublimes) in 40 ml. of tetrahydrofuran and a solution of 2.04 g. of dicyclohexyl carbodiimide in 40 ml. of tetrahydrofuran are then added. The whole is left to stand for 3 hours at 15° and then diluted with 350 ml. of water. After a short time, a semisolid mass appears on the surface which is removed and discarded. The solution is first concentrated in a rotary evaporator under vacuum and then lyophilised. The residue is taken up in 30 ml. of water and 55 ml. of methyl isobutyl ketone and it is treated as described in Example 1. In this way, the sodium salt of 3-methoxy-2-pyridyl-penicillin is obtained as a white powder. In the IR spectrum (potassium bromide) it shows the typical $\beta$-lactam band at $5.65\mu$.

The minimal concentrations of 3-methoxy-2-pyridyl-penicillin which inhibit the growth of *Staphylococcus lactis* NCTC 8340 in the incorporation test as described in Example 1 is: 0.1 $\mu$g./ml.

In albino mice infected with *Staphylococcus aureus* Smith, the $CD_{50}$ was 2.4 mg./kg. on intramuscular administration and 3.4 mg./kg. on oral administration of the penicillin described in this example.

Example 5

(a) 3.04 g. of dithio-3,3'-dipyridyl-2,2'-dicarbonic acid (Lit.: J. Org. Chem. 19, 711–717 (1954)) are dissolved in 115 ml. of anhydrous ethanol and heated to 60°. 3.74 g. of glucose are added in small portions. 2.37 g. of sodium hydroxide dissolved in 50 ml. of anhydrous ethanol are added dropwise at the same temperature and subsequently the reaction mixture is stirred for 2 hours. After cooling 9.25 g. of freshly distilled ethyl iodide is added dropwise within 15 minutes. Then the reaction mixture is stirred for 2 hours at 25° and another 4 hours at 60° and subsequently left standing for 14 hours. After filtration the reaction mixture the filtrate is evaporated to dryness in vacuo and the residue is taken up in 50 ml. of water/chloroform 1:1. The phases are separated and the aqueous part is washed twice with small amounts of chloroform. The pH of this solution is now about 9. It is adjusted to 4.7 with 2 N hydrochloric acid. The solution is extracted with ether in a continuous working extraction-apparatus (Kutscher-Steudel). From the residues of the extracts white crystals of 3-ethylthio-picolinic acid (M.P. 114–116°) are obtained after recrystallisation from chloroform/ether.

(b) The penicillin as prepared from 3-ethylthio-picolinic acid in an analogous manner as described in Example 3 shows in the IR spectrum (potassium bromide) the typical β-lactam band at 5.65μ. Its antibacterial activity is similar to that as described in Example 3

Example 6

Other penicillins of Formula I are produced in the manner described in Example 3 from the acids given below. In the IR spectrum (potassium bromide), all products show the characteristic β-lactam bands at 5.65μ. In the incorporation test as applied in Example 1 their minimal concentrations inhibiting the growth of *Staphylococcus aureus* Smith are 1 p.p.m. (μg./ml.).

| Acid | Penicillin |
|---|---|
| 3-allyloxy-picolinic acid | 3-allyloxy-2-pyridyl-penicillin. |
| 3-methylthio-picolinic acid | 3-methylthio-2-pyridyl-penicillin. |
| 3-n-propylthio-picolinic acid | 3-n-propylthio-2-pyridyl-penicillin. |
| 3-allylthio-picolinic acid | 3-allylthio-2-pyridyl-penicillin. |

The following examples further illustrate the production of tablets, dragées, dry ampoules and ointments.

Example 7

250 g. of 3-ethoxy-2-pyridyl-penicillin, as in free acid form are mixed with 175.80 g. of lactose and 169.70 g. of potato starch, the mixture is moistened with an alcoholic solution of 10 g. of stearic acid and granulated through a sieve. After drying, 160 g. of potato starch, 200 g. of talcum, 2.50 g. of magnesium stearate and 32 g. of colloidal silica are mixed in and the mixture is pressed into about 10,000 tablets each weighing 100 mg. and containing 25 mg. of active substance. If desired, the tablets can be grooved for better adaptation of the dosage.

Similarly, tablets are prepared in which the above active substance in free acid form is replaced by the same amount of the sodium salt or the potassium salt thereof.

Example 8

A granulate is produced from 250 g. of 3-allyloxy-2-pyridyl-penicillin, 175.90 g. of lactose and the alcoholic solution of 10 g. of stearic acid. After drying, it is mixed with 56.60 g. of colloidal silica, 165 g. of talcum, 20 g. of potato starch and 2.50 g. of magnesium stearate and the mixture is pressed into 10,000 dragée cores. These are then coated with a concentrated syrup of 502.28 g. of crystallised sucrose, 6 g. of shellac, 10 g. of gum arabic, 0.22 g. of dyestuff and 1.5 g. of titanium dioxide and dried. The dragées obtained each weigh 120 mg. and contain 25 mg. of active substance.

Example 9

To produce buffered dry ampoules 0.100 g. of the sodium salt of 3-n-propoxy-2-pyridyl-penicillin and 0.010 g. of tribasic anhydrous sodium citrate are mixed and filled into multiple dose vials. Before administration 5 ml. of distilled water are added and the vials thoroughly shaken.

Example 10

An ointment containing 0.1% of active substance is produced from

|   | G. |
|---|---|
| 3-ethoxy-2-pyridyl-penicillin | 0.10 |
| Thin paraffin oil | 2.00 |
| Wool fat | 10.00 |
| White petrolatum | ad 100.00 | by melting together wool fat and petrolatum at lower temperatures and adding to this a mixture of the active substance and paraffin oil. The total mixture is stirred until it is cold.

What is claimed is:

1. An antibacterial composition for controlling gram positive bacterial infections in mammals consisting essentially of an antibacterially effective amount of
   (a) A compound of the formula

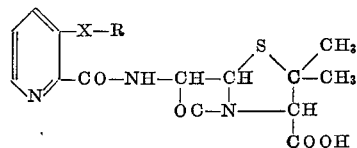

wherein:
   X represents oxygen or sulfur, and
   R represents straight-chain alkyl of from 1 to 4 carbon atoms or straight-chain alkenyl of from 2 to 4 carbon atoms, or a pharmaceutically acceptable salt thereof with an inorganic or organic base, and
   (b) an inert, pharmaceutically acceptable carrier compatible therewith.

2. An antibacterial composition as defined in claim 1, wherein said compound is present in an amount of about 5 to 90% calculated on the total weight of the composition.

3. An antibacterial composition as defined in claim 1, wherein in the formula of said compound R represents straight-chain alkyl of from 2 to 4 carbon atoms or straight-chain alkenyl of from 3 to 4 carbon atoms and X is oxygen.

4. An antibacterial composition as defined in claim 1, wherein in the formula of said compound R is ethyl and X is oxygen.

5. An antibacterial composition as defined in claim 1, wherein in the formula of said compound R is n-propyl and X is oxygen.

6. An antibacterial composition as defined in claim 1, wherein in the formula of said compound R is allyl and X is oxygen.

7. A method of controlling gram positive bacteria causing infectious disease, which comprises administering to a mammal suffering from such disease an antibacterially effective amount of a compound of the formula

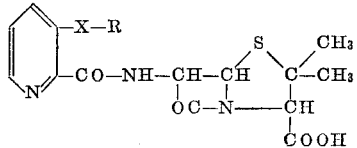

wherein:

X represents oxygen or sulfur, and

R represents straight-chain alkyl of from 1 to 4 carbon atoms or straight-chain alkenyl of from 2 to 4 carbon atoms, or a pharmaceutically acceptable salt thereof with an inorganic or organic base.

8. A method as described in claim 7 wherein said compound is administered in a total daily dosage of at least about 300 mg.

9. A method as described in claim 7 wherein said gram positive bacteria are penicillin G-resistant staphylococci.

10. A method as described in claim 7 wherein said compound is administered parenterally.

11. A method as described in claim 7 wherein said compound is administered locally.

12. A method as described in claim 7 wherein in the formula of said compound R represents straight-chain alkyl of from 2 to 4 carbon atoms or straight-chain alkenyl of from 3 to 4 carbon atoms, and X is oxygen.

13. A method as described in claim 7 wherein in the formula of said compound R is ethyl and X is oxygen.

14. A method as described in claim 7 wherein in the formula of said compound R is n-propyl and X is oxygen.

15. A method as described in claim 7 wherein in the formula of said compound R is allyl and X is oxygen.

References Cited

UNITED STATES PATENTS 3,174,964   3/1965   Hobbs et al. _____ 260—239

ALBERT T. MEYERS, Primary Examiner

J. GOLDBERG, Assistant Examiner